(12) United States Patent
Boscia

(10) Patent No.: US 10,460,432 B2
(45) Date of Patent: Oct. 29, 2019

(54) DIGITAL IMAGE CORRELATION PATTERN APPLICATION WITH ASPIRATED INK

(71) Applicant: The Boeing Company, Chicago, IL (US)

(72) Inventor: Antonio L. Boscia, Harvest, AL (US)

(73) Assignee: The Boeing Company, Chicago, IL (US)

( * ) Notice: Subject to any disclaimer, the term of this patent is extended or adjusted under 35 U.S.C. 154(b) by 311 days.

(21) Appl. No.: 15/286,540

(22) Filed: Oct. 5, 2016

(65) Prior Publication Data

US 2018/0094915 A1   Apr. 5, 2018

(51) Int. Cl.
*G06T 7/00* (2017.01)
*G01B 11/16* (2006.01)

(52) U.S. Cl.
CPC .......... *G06T 7/0004* (2013.01); *G01B 11/165* (2013.01); *G01B 11/20* (2013.01)

(58) Field of Classification Search
CPC ...... G06T 7/0004; G01B 11/165; G01B 11/20
See application file for complete search history.

(56) References Cited

U.S. PATENT DOCUMENTS

| 2014/0037217 A1* | 2/2014 | Iliopoulos | G06K 9/6232 382/201 |
| 2016/0154926 A1* | 6/2016 | Szigeti | G06T 5/006 703/8 |
| 2017/0194553 A1* | 7/2017 | Ifju | F03G 7/065 |
| 2018/0238784 A1* | 8/2018 | Lin | G01N 3/04 |

OTHER PUBLICATIONS

How to Splatter Paint, http://www.wikihow.com/Splatter-Paint.
Schmidt, T and Tyson, J., Dynamic Strain Measurement Using Advanced 3D Photogrammetry, Teilion Quality Systems, Dec. 2002.

* cited by examiner

*Primary Examiner* — Lisa M Caputo
*Assistant Examiner* — Jamel E Williams
(74) *Attorney, Agent, or Firm* — Felix L. Fischer

(57) ABSTRACT

A system for strain testing employs an ink aspiration system adapted to apply a stochastic ink pattern. The stochastic pattern is applied to a test article and a test fixture receives the test article. A digital image correlation (DIC) imaging and calculation system is positioned relative to the test article to image the stochastic ink pattern.

18 Claims, 6 Drawing Sheets

DIGITAL IMAGE CORRELATION PATTERN APPLICATION WITH ASPIRATED INK

BACKGROUND INFORMATION

Field

Embodiments of the disclosure relate generally to strain performance testing of structures and more particularly to a method and system employing an aspiration system for spraying ink from a permanent marker in a stochastic pattern on a structural surface and evaluating strain induced on the structure by digital image correlation of the pattern.

Background

Digital Image Correlation (DIC) systems are used to measure deformations and calculate strains measured during material testing. DIC was developed to replace the use of bonded strain gages and extensometers in mechanical testing. DIC systems such as ARAMIS available from GOM mbH, Braunschweig, Germany, are typically portable 3-D non-contact optical measurement system used for measurement of surface distortion on images taken with hi-resolution CCD/CMOS camera systems. The imaging system uses a stochastic pattern painted on the material surface to measure distortion and displacement using pattern recognition and tracking software.

In the prior art, the stochastic pattern is applied to material surface using standard paints applied using spray can or paint gun applicators. Paints used usually consist of a flat white basecoat with an over-sprayed flat black speckled pattern. The pattern is critical for quality data acquisition but it is highly dependent on the adhesion of the paint to the material surface to accurately transfer changes and displacements of the material.

Inks from permanent markers like the Sharpie® brand have been used in DIC pattern applications for performing minor touch ups. When such permanent marker ink is applied in normal fashion by surface contact, it has an inherently hi-gloss/reflective appearance. This can cause light saturation in the pattern image in the DIC system cameras preventing the software from identifying gray-scale recognition and distinguishing between the light and dark areas needed to accurately track displacements/movements in the pattern.

SUMMARY

Exemplary embodiments provide a system for strain testing having an ink aspiration system adapted to apply a stochastic ink pattern. The stochastic pattern is applied to a test article and a test fixture receives the test article. A digital image correlation (DIC) imaging and calculation system is positioned relative to the test article to image the stochastic ink pattern.

The embodiments disclosed provide a method for strain testing wherein a stochastic pattern is created with ink aspirated from a source and spayed on an article to be tested. A strain test is performed on the article inducing a change in the stochastic pattern of the ink. The degree of strain is then measured using a digital image correlation (DIC) imaging and calculation system.

BRIEF DESCRIPTION OF THE DRAWINGS

The features, functions, and advantages that have been discussed can be achieved independently in various embodiments of the present disclosure or may be combined in yet other embodiments, further details of which can be seen with reference to the following description and drawings.

DETAILED DESCRIPTION

The embodiments and methods described herein provide a system for aspirating ink from a permanent marker and spraying it onto a material surface in a stochastic pattern for use in strain measurement with a DIC system. Metallic particles in the ink are somewhat supported in the solvent or base in the fluid ink during surface contact. This application method results in a flat, non-glossy appearance and allows for an optimum pattern for the video imaging and displacement tracking by software in the DIC system.

The use of inks for the DIC pattern has many benefits over standard paints. One primary benefit is that it greatly increases accuracy and reliability. Paints have higher cohesion properties than inks. This can cause the pattern to inaccurately transfer surface displacement of the material to the DIC pattern due to adhesion failure of the basecoat paint. It can also muffle the displacement of the material depending on the type of paint and applied thickness as most paints are made with polymer binders which gives it flexible characteristics allowing it to expand and contract with the surface material to help prevent it from cracking and disbonding.

Inks, unlike paints, have high adhesion and low cohesion properties. Inks typically employ finely around inorganic materials called pigments, and combination of cellulose-based binders and solvents called carriers. This allows the ink pattern to transfer the substrate material movement providing higher accuracy when tracking displacements using DIC.

Figure 1A:
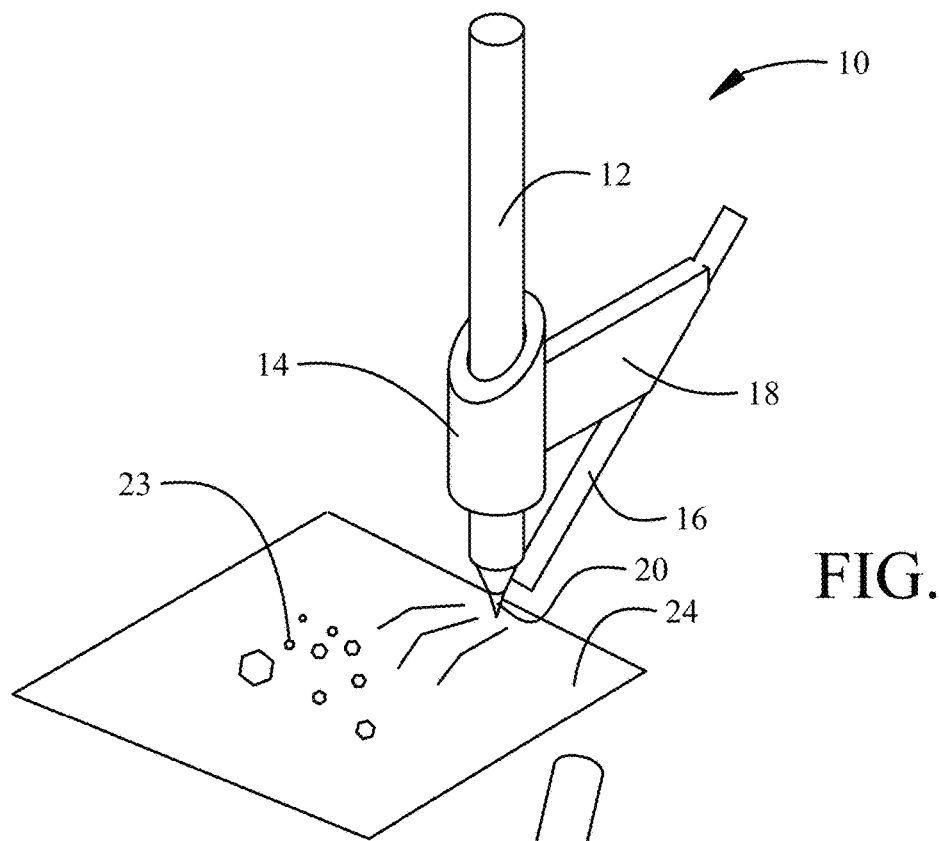
FIG. 1A is a pictorial representation of an application system for aspirating ink from a permanent marker.
Figure 1B:
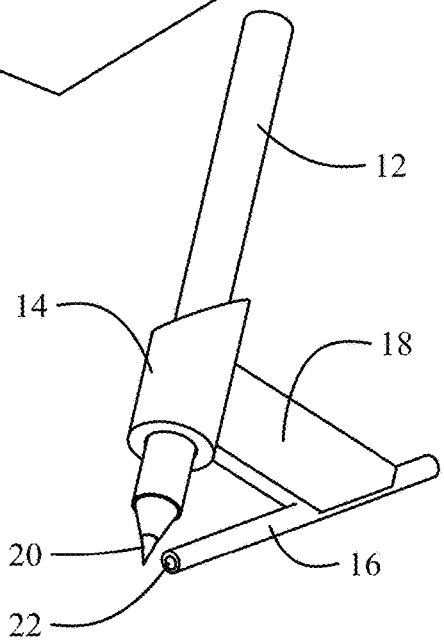
FIG. 1B is an alternative view of the application system of FIG. 1A.

Referring to the drawings, FIGS. 1A and 1B show an ink aspiration system 10 for a writing instrument such as a permanent marker 12. The permanent marker 12 is removably positioned in a stirrup or loop 14. An aspirating gas conduit 16 is supported by a bracket 18 in spaced relation to a porous tip 20 of the permanent marker 12 with an orifice 22 (seen in FIG. 1B) positioned adjacent the porous tip 20 to direct aspirating gas (typically air) from the aspirating gas conduit 16 tangentially across the porous tip 20 to entrain ink from the tip. A flow pattern 23 (exaggerated in size for clarity) created on an adjacent surface 24 by the aspirated ink is adjusted based on pressure and/or flow rate of the aspirating gas, position of the permanent marker 12 in the loop 14 and distance of the porous tip 20 from the surface. In certain applications a surface preparation may be desirable prior to application of the ink to the surface. As an example, most composites have glossy surfaces and lightly scuffing the surface with ultrafine Scotch Brite® or other mild abrasive prior to pattern application is desirable. In an exemplary operation, the porous tip 20 is held 1-12 inches from the article as a moving volume of air having a mass flow of 5-15 l/min (0.18-0.53 cuft/min) is blown substantially tangentially to the tip thereby pulling the ink through the tip into the airflow and causing a pattern on the article. The air pressure inducing the airflow is typically 10-20 psi. Applying pressure on the porous tip 20 by pressing against a surface or tool to slightly crush or fracture the tip increases ink flow from the marker tip. Applying the pressure to the porous tip at an angle aligned with the conduit enhances ink flow.

Figure 2:
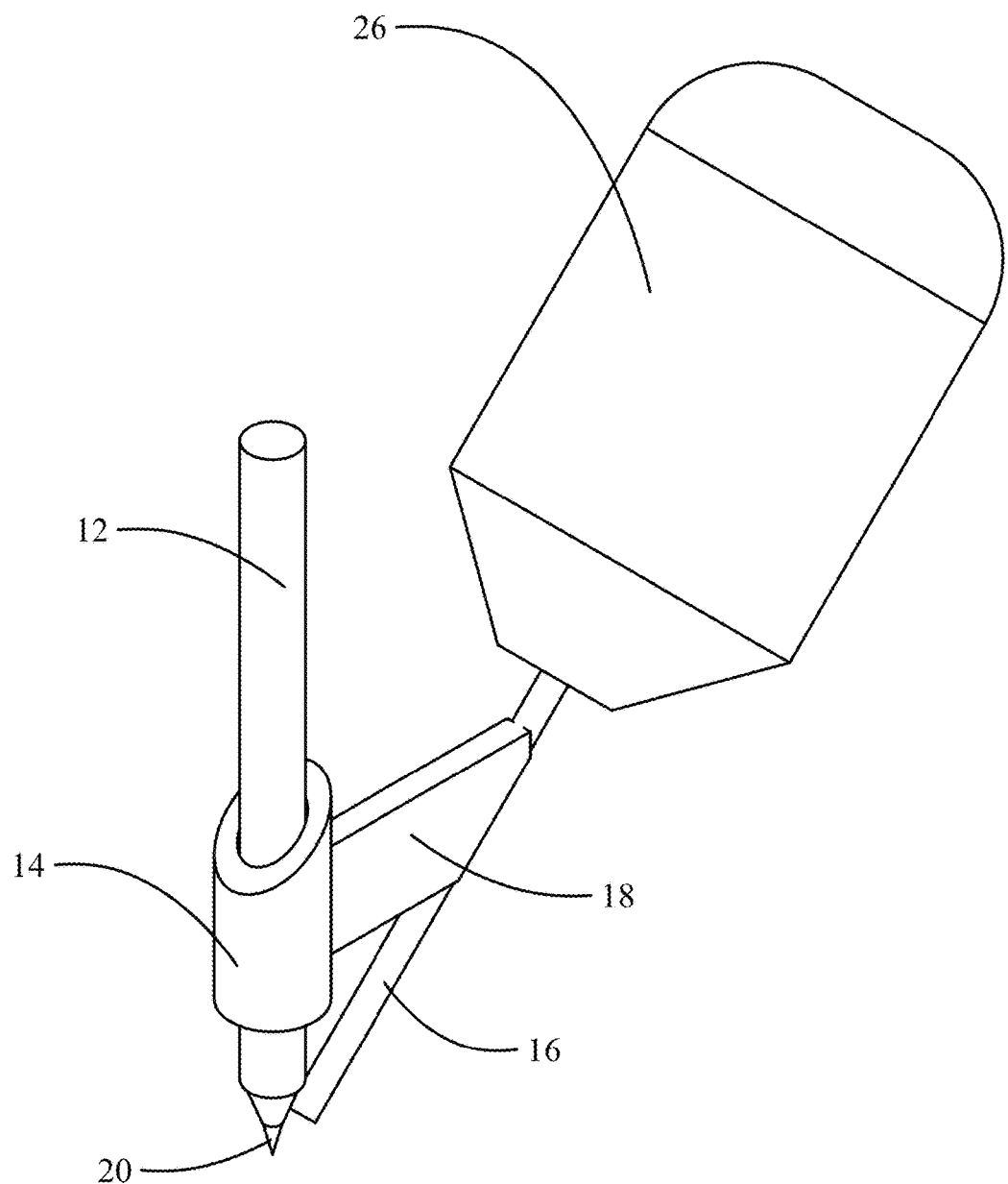
FIG. 2 is a pictorial representation of a manually activated bulb aspirated application system.

Aspirating gas may be provided to the conduit 16 using various structures. A first exemplary embodiment is shown in FIG. 2 wherein a flexible bulb 26 is attached to the conduit 16. Compressing the bulb induces a flow of air from the bulb into the conduit which is then expelled at the orifice 22 to entrain ink from the marker 12. An exemplary commercially produced system for this embodiment known as a Distress Marker Spritzer is available from Ranger Industries, Inc., Tinton Falls, N.J.

Figure 3:
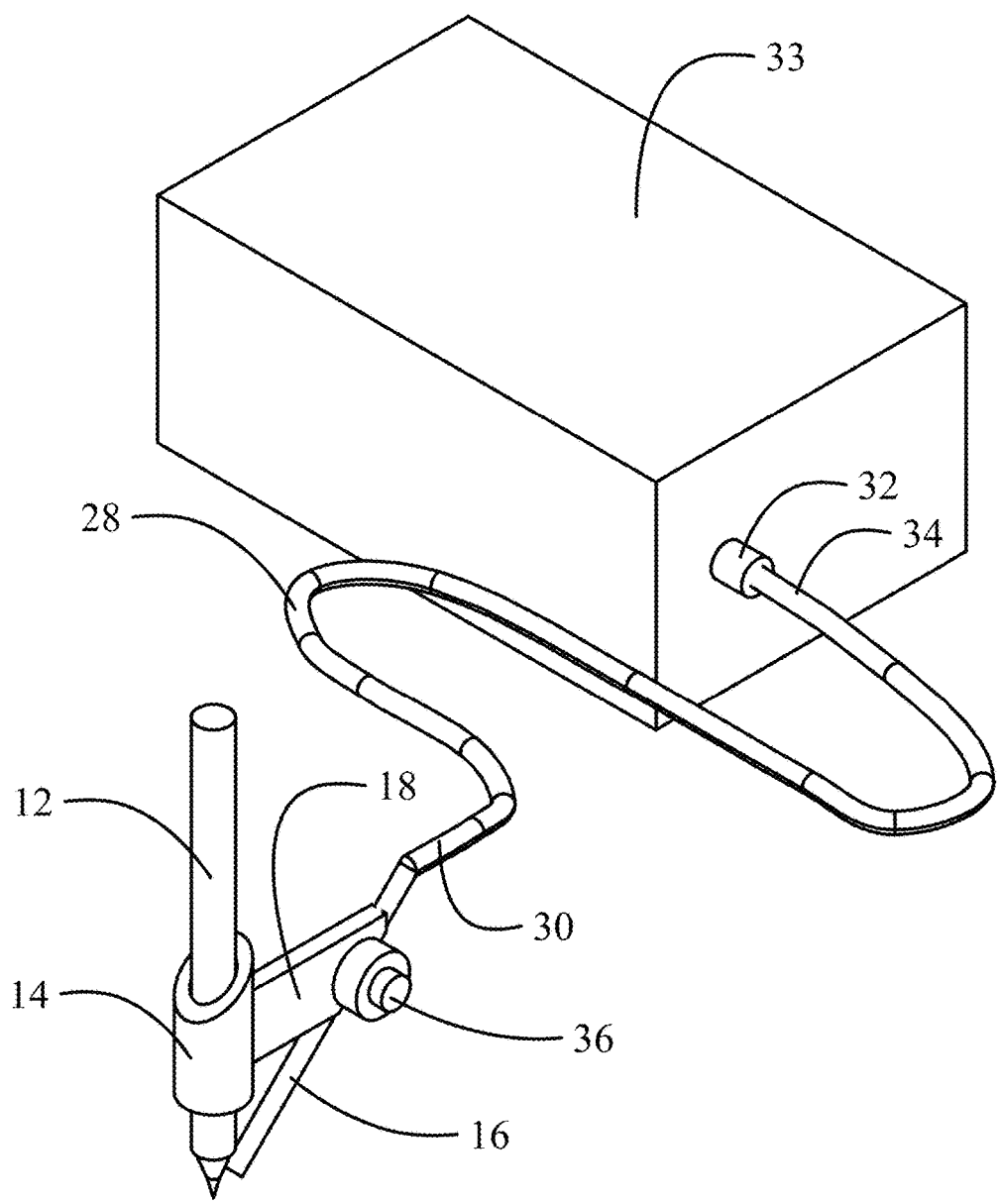
FIG. 3 is a pictorial representation of a pressurization source aspirated application system.

Alternatively, as shown in FIG. 3, a flexible supply tube 28 is coupled to the conduit 16 at a first end 30 and incorporates an attachment fitting 32 at a second end 34. The attachment fitting 32 is attached to a pressurized gas supply 33 and aspirating gas is provided to the flexible supply tube 28. An actuation control 36 is mounted on the bracket 18 (or alternatively on the loop 14) which is adapted to control flow of gas from the flexible supply tube 28 through the conduit 16. The pressurized gas supply may be a self-contained electrically driven pump system such as an eBrush® kit available from Craftwell incorporated, College Point, N.Y. The actuation control 36 may activate the electrically driven pump and may additionally provide flow regulation. Alternatively, the pressurized gas supply is shop air or other compressed gas source with an appropriate regulator for desired pressure and flow rates which can be accommodated by the supply tube and conduit. The actuation control 36 is a secondary regulator controlling flow from the gas source into the conduit.

Figure 4:
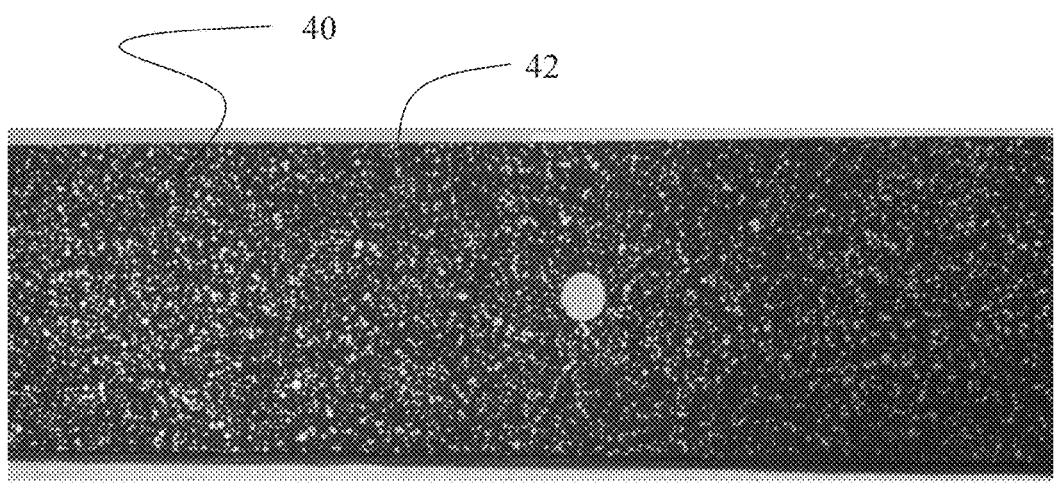
FIG. 4 is an example stochastic pattern created with ink aspirated from a permanent marker using the exemplary aspiration systems.

An example stochastic pattern created employing an embodiment of the marker ink aspiration system 10 is shown in FIG. 4 with the pattern of ink dots 40 applied directly to a surface of a carbon fiber reinforced plastic (CFRP) coupon 42 using ink from a silver Sharpie® brand permanent marker.

Inks employed in the ink aspiration system have pigments of finely ground inorganic material suspended in carriers including a combination of cellulose-based binders and solvents. Exemplary inks include pigments of iron sulfate, aluminum, chromium, copper, bronze, iron oxide, graphite, carbon, zinc, molybedenum and cadmium in an alcohol, glycol or ether carrier. Permachrome as a pigment and xylene and/or toluene as a solvent in the carrier are preferred for water resistant inks. Non-water resistant inks are employed in providing easily removable stochastic patterns on test articles.

Inks dry substantially immediately upon contact with the surface to which they are applied. This allows immediate testing after application. Inks are easily removed with most solvents without leaving any residues and less reactive to temperature changes allowing for a wider range environmental testing.

Figure 5:
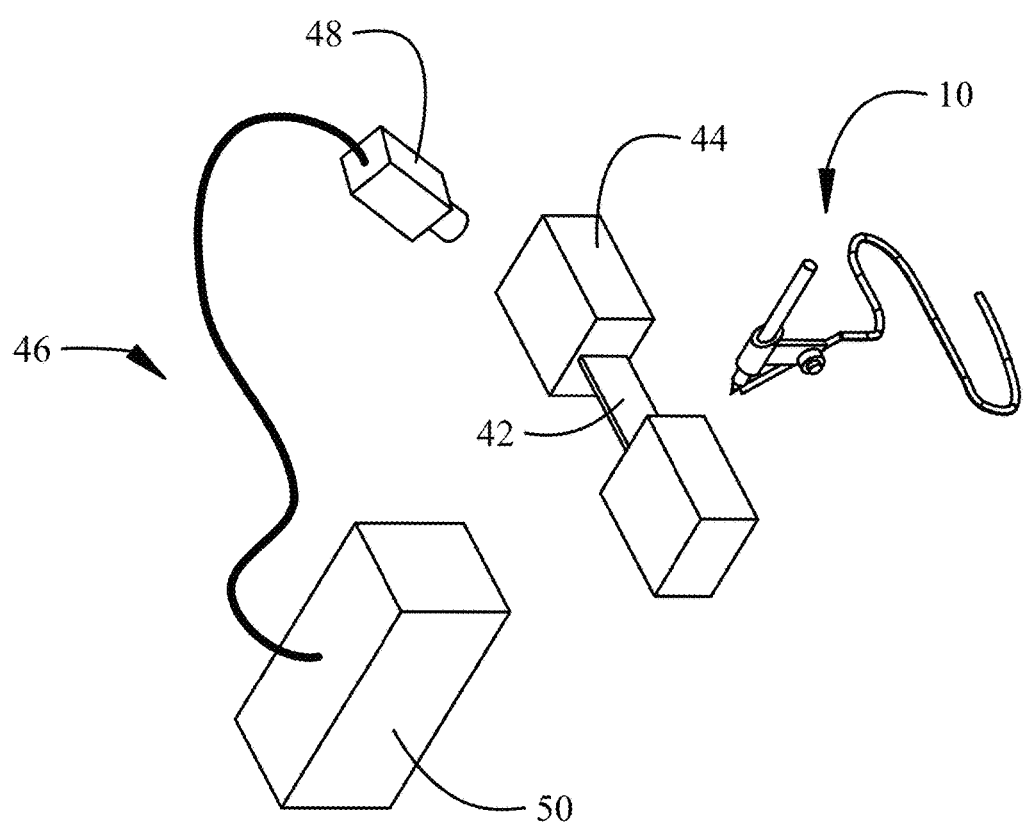
FIG. 5 is a block diagram of a strain measurement system employing a stochastic pattern applicator as disclosed herein; and, FIG. 6 is a flow chart of a method strain testing employing DIC patterns applied as disclosed herein.

A strain testing system employing stochastic pattern application using the exemplary embodiments is shown in FIG. 5. A marker ink aspiration system 10 is provided to apply a stochastic ink pattern to a test article such as coupon 42. The coupon is mounted on or constrained in a test fixture 44 which may apply tensile or bending forces to the test article. A DIC imaging and calculation system 46 such as an ARAMIS system as previously described provides at least one imager 48 (for 2D imaging or a stereo imager system for 3D imaging) which is interconnected to a computer 50 incorporating software for image processing and DIC calculations.

Example 1

ARAMIS images using a 5M system and 50 mm lenses were obtained. The test material was a CFRP OHT test coupon measuring 1.5" width×13" height×0.125" depth fitted with a strain gage for a data baseline for comparison purposes. The stochastic pattern was applied directly to the CFRP surface using a silver Sharpie brand permanent marker as the permanent marker 12 with aspiration of the ink using an ink aspiration system 10 as described herein. The field of view (FOV) used was 100 mm×80 mm. The noise floor check (NFC) showed less than a 150 micro strain variance. The coupon was exposed to tensile strain using a tensile test machine. The DIC post processing identified an image pixel deviation of 0.001 and an intersect deviation of 0.002 pixels. The image quality and pattern tracking was consistent throughout the entire test. A strain gage measurement at break detection was 13,576 µstrain and the ARAMIS measurement was 13,555 µstrain giving a difference of 21 µstrain.

Figure 6:
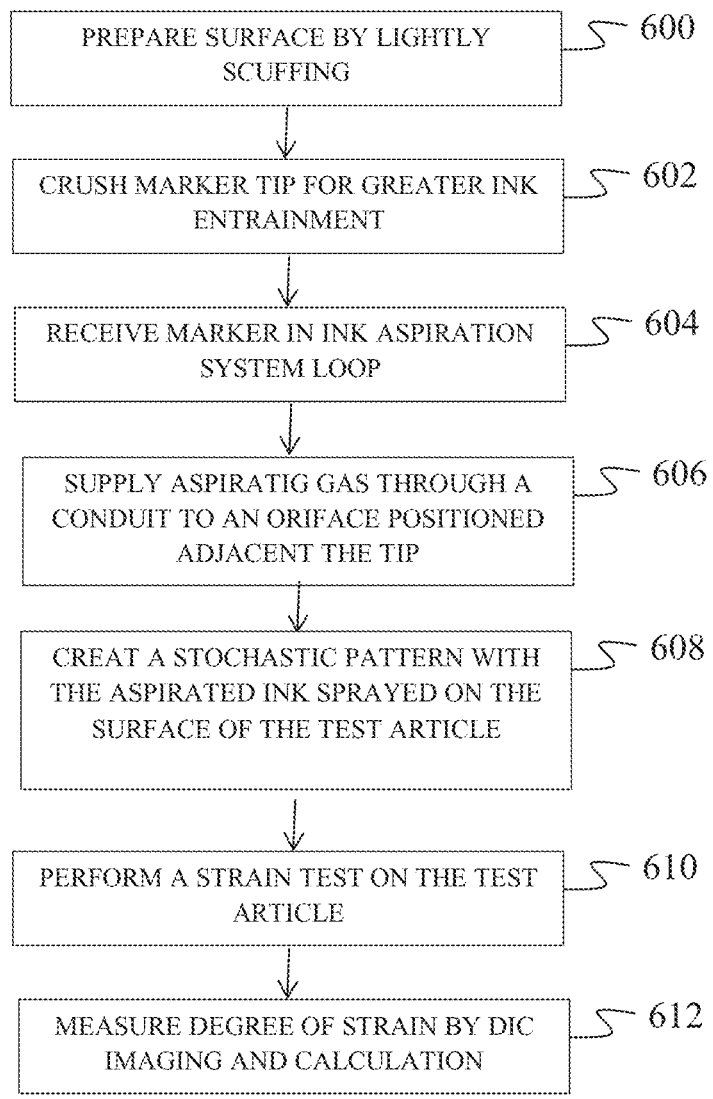

A method for strain test measurement employing a marker ink aspiration system for application of a stochastic pattern and a DIC imaging and calculation system as disclosed for the embodiments herein is shown in FIG. 6. For certain applications a surface preparation may be desirable prior to application of the ink to the surface and lightly scuffing the surface with a mild abrasive is accomplished, step 600. Ink is aspirated from a source, a writing instrument and particularly a porous tipped permanent marker. The tip of the marker altered to allow greater entrainment of the ink by crushing the tip or breaking the tip, step 602. The marker is received in the loop of an ink aspiration system, step 604, and aspirating gas is supplied through an orifice in a conduit positioned adjacent the tip of the marker, step 606. Crushing the tip at an angle aligned with the conduit enhances the ink flow. A stochastic pattern is created with the aspirated ink spayed on an article to be tested, step 608. A strain test is then performed on the article inducing a change in the stochastic pattern of the ink, step 610. The degree of strain is measured using a digital image correlation (DIC) imaging and calculation system, step 612. As previously defined, the ink is a pigmented ink and may be selected to be water resistant or not water resistant. As also previously defined, the pigment in the ink is selected from iron sulfate, aluminum, chromium, copper, bronze, iron oxide, graphite, carbon, zinc, molybdenum, cadmium and permachrome and has a carrier containing a solvent selected from xylene and toluene. Permachrome and xylem comprise the preferred pigment and carrier solvent.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A method for strain testing comprising:
creating a stochastic pattern with ink from a permanent marker having a porous tip by supplying aspirating gas through an orifice in a conduit positioned adjacent the porous tip to spray the ink on an article to be tested;
performing a strain test on the article inducing a strain in the article with a resulting change in the stochastic pattern of the ink; and,
measuring the strain using a digital image correlation (DIC) imaging and calculation system viewing the stochastic pattern.

2. The method of claim 1 further comprising: altering the porous tip to allow greater entrainment of the ink.

3. The method of claim 2 wherein the step of altering the tip comprises crushing the porous tip.

4. The method of claim 3 wherein the step of crushing the porous tip further comprises crushing the porous tip at an angle aligned with the conduit.

5. The method of claim 2 wherein the step of altering the tip comprises breaking the porous tip.

6. The method of claim 1 wherein the ink is water resistant.

7. The method of claim 1 wherein the ink is not water resistant.

8. The method of claim 1 wherein the ink is a pigmented ink.

9. The method of claim 8 wherein the ink contains a pigment selected from iron sulfate, aluminum, chromium, copper, bronze, iron oxide, graphite, carbon, zinc, molybdenum, cadmium and permachrome.

10. The method of claim 8 wherein the ink contains permachrome.

11. The method of claim 8 wherein the ink has a carrier containing a solvent selected from xylene and toluene.

12. The method of claim 8 wherein the ink has a carrier containing xylene.

13. A system for strain testing comprising:
an ink aspiration system adapted to apply a stochastic ink pattern, said ink aspiration system having
a loop receiving a writing instrument; and,
an aspirating gas supply conduit supported with respect to the loop to position an orifice proximate a tip of the writing instrument to entrain ink in aspirating gas flowing through the orifice; a test article on which the stochastic ink pattern is applied;
a test fixture receiving the test article; and,
a digital image correlation (DIC) imaging and calculation system positioned relative to the test article to image the stochastic ink pattern.

14. A system for strain testing as defined in claim 13 wherein the writing instrument is a marker having a felt tip and the orifice is positioned adjacent the tip to direct the aspirating gas from the aspirating gas supply conduit tangentially across the tip.

15. A system for strain testing as defined in claim 14 wherein ink entrained in the aspirating gas contains a pigment selected from iron sulfate, aluminum, chromium, copper, bronze, iron oxide, graphite, carbon, zinc, molybdenum, cadmium and permachrome.

16. A system for strain testing as defined in claim 14 wherein the aspirating gas supply conduit is connected to a flexible bulb compressible to induce gas flow into the aspirating gas supply conduit.

17. A system for strain testing as defined in claim 14 wherein a flexible supply tube is connected to the aspirating gas supply conduit at a first end and incorporates an attachment fitting at a second end attached to a pressurized gas supply and further comprising an actuation control adapted to control flow of aspirating gas from the flexible supply tube through the aspirating gas supply conduit.

18. A method for strain testing comprising:
creating a stochastic pattern by aspirating ink from a permanent marker having a porous tip with a gas flow adjacent the tip to spray the ink on an article to be tested;
performing a strain test on the article inducing a strain in the article with a resulting change in the stochastic pattern of the ink; and,
measuring the strain using a digital image correlation (DIC) imaging and calculation system viewing the stochastic pattern.

\* \* \* \* \*